United States Patent Office 2,810,713
Patented Oct. 22, 1957

2,810,713

QUATERNARY AMMONIUM COMPOUNDS AND METHODS OF PRODUCING THEM

Sidney Melamed, Philadelphia, Pa., assignor to Rohm & Haas Company, Philadelphia, Pa., a corporation of Delaware No Drawing. Application March 21, 1955, Serial No. 495,785

17 Claims. (Cl. 260—80.3)

This invention relates to new polymeric quaternary ammonium compounds and to their production. It is particularly concerned with the production of copolymers comprising units containing quaternary ammonium nitrogen and other units containing carbonamido or ureido groups, which copolymers are water-soluble or readily water-dispersible but, by virtue of the amido or ureido groups, are convertible to an insoluble condition.

Such copolymers have a wide variety of uses, as will be pointed out hereinafter. However, they are useful as adjuvants to paper for anchoring other materials thereto and they are especially useful as antistatic agents for the treatment of hydrophobic textiles, because of the fact that they are readily converted to insoluble condition after incorporation in the paper or textile whereby they become resistant to removal on wetting, washing or scouring.

The new compounds of the present invention are copolymers containing at least 30 mole percent, and preferably from 50 to 80 mole percent, of units having the structure of Formula I hereinafter and at least 5 mole percent of at least one of the units selected from the group consisting of those having the structure of one of Formulas II and III:

I  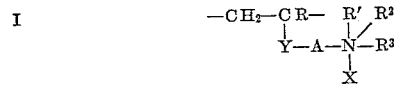

where R is hydrogen or methyl, Y is selected from —CONR— and —COO—, A is a straight-chain or branched-chain alkylene group having 2 to 10 carbon atoms which may be substituted by one or more hydroxyl groups, at least two of the carbon atoms thereof being connected in a chain between the N atom and the Y group of the formula, R' and $R^2$ may be (1) separate groups selected individually from the group consisting of saturated and ethylenically unsaturated hydrocarbon groups of 1 to 4 carbon atoms, and (2) a single group selected from the morpholino residue :$(C_2H_4)_2O$, the pyrrolidino residue —$C_4H_8$—, the piperidino residue, —$C_5H_{10}$—, and an N-alkyl piperazino residue

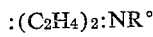

where $R°$ is an alkyl group of 1 to 18 carbon atoms, such as methyl, ethyl, isopropyl, $R^3$ is selected from benzyl and saturated and ethylenically unsaturated hydrocarbon groups of 1 to 4 carbon atoms, and X is a negative, salt-forming atom or radical, such as one of the halides, e. g., bromide, chloride, iodide, $R^3OSO_3$, and $(R^3O)_2PO_2$, the radical $R^3$ being as defined above.

II 

where R is the same as above, and $R^4$ is selected from hydrogen, methylol (—$CH_2OH$), and alkoxymethyl, preferably —$CH_2OCH_3$.

III 

where R, Y, and A are as defined hereinabove, and $R^5$ is selected from —$NHCONHR^4$ and

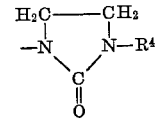

the radical $R^4$ being the same as defined above.

Preferred copolymers are those in which the radical A is selected from —$CH_2CH_2$—, —$CH(CH_3)CH_2$—, —$CH_2CH(CH_3)$— and —$CH_2CH_2CH_2$—.

The copolymers may consist entirely of units having the structure of Formulas I, II, and/or III or they may contain up to 65 mole percent of other comonomers, such as acrylonitrile, the vinyl aromatic compounds, more particularly the vinyl aromatic hydrocarbons (e. g., styrene, isopropenyl toluene, the various dialkyl styrenes, etc.), other aliphatic compounds containing a $CH_2=C<$ grouping, e. g., the various substituted acrylonitriles, (e. g., methacrylonitrile, ethacrylonitrile, phenylacrylonitrile, etc.), N-monoalkyl and -dialkyl acrylamides and methacrylamides, e. g., N-monomethyl, -ethyl, -propyl, -butyl, etc. and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, etc., esters of an acrylic acid (including acrylic acid itself and the various α-substituted acrylic acides, e. g., methacrylic acid, ethacrylic acid, phenylacrylic acid, etc.), more particularly the alkyl esters of an acrylic acid, e. g., the methyl, ethyl, propyl, isopropyl, n-butyl, isobutyl, sec-butyl, tert-butyl, amyl, hexyl, heptyl, octyl, decyl, dodecyl, etc. esters of acrylic, methacrylic, ethacrylic, phenylacrylic, etc. acids, vinyl ethers, such as butyl vinyl ether, N-vinyl compounds such as N-vinyl pyrrolidone, and olefins, such as ethylene, fluorinated vinyl compounds, such as vinylidene fluoride, other vinyl ethers, such as methyl vinyl ether, aminoisobutyl vinyl ether, amidoalkyl vinyl ethers such as formamidoethyl vinyl ether, N-dimethyl- or N-methylamidoethyl vinyl ether, and ureidoalkyl vinyl ethers, e. g., ureidoethyl vinyl ether, and any of the other ureidoalkyl vinyl ethers mentioned in U. S. Patent 2,689,844, September 21, 1954, as well as other vinyl aromatic and vinyl aliphatic compounds, and other compounds containing a single $CH_2=C<$ grouping.

Depending upon the particular comonomer selected, the polymer obtained may be changed from water-soluble to oil-soluble, to alcohol-soluble, or to any combination of these solubilities.

Various methods may be employed for making the new copolymers. For example, when R', $R^2$, and $R^3$ are saturated, they may be made by copolymerizing a mixture of the proper proportions of a monomer having the structure of Formula IV and at least one monomer having the structure of one of Formulas V and VI, with or without additional comonomers of other kinds:

IV 

V 

VI 

where the symbols are as defined hereinbefore. These monomers and their methods of preparation are in some cases publicly known and available, such as in U. S. Patents 2,689,844 and 2,694,695, and in other cases they and their preparation are disclosed in U. S. applications for patent in the hands of a common assignee Serial Numbers 348,103 (now Patent 2,734,890); 348,105 (now Patent 2,727,019); and 348,109 (now Patent 2,727,016), filed April 10, 1953; Serial No. 441,643, filed July 6, 1954; and Serial No. 466,198, filed November 1, 1954. The copolymerization may be effected with such catalysts or initiators as hydrogen peroxide alone or a mixture of ammonium or an alkali metal persulfate with sodium hydrosulfite. Generally, ½% of the hydrogen peroxide or a mixture of ½% of the sulfate with 0.2% of sodium hydrosulfite may be used. Transfer agents and other molecular weight regulators may be used. Generally polymers of 5,000 to at least 50,000 molecular weight may be obtained by this procedure.

If desired, the copolymerization may be effected with a tertiary amine monomer or a salt thereof, such as the acetic acid salt instead of the quatenary monomer of Formula IV. Such an amine monomer may have the structure of Formula VII:

VII

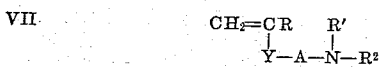

where the symbols are the same as before except that R' and R² are saturated. After copolymerization by the same procedure as described for the quaternary monomer of Formula IV, the amine groups may be partially or completely quaternized with an alkylating agent having the structure of Formula VIII:

VIII 

where the symbols are the same as defined above. The amount of alkylating agent should be sufficient to provide in the final quaternized copolymer, at least 30 mole percent of units containing quaternary ammonium units of Formula I. The quaternization may be effected in a polar solvent, for example, in water, dimethylformamide, dimethylacetamide, acetonitrile, or a lower alcohol, such as methanol, ethanol, isopropanol, and the like. Temperatures from room temperature to 125° C., or even up to 150° C. in some cases, may be used. Preferably the temperature is maintained at 80° to 90° C. which may readily be accomplished by refluxing with ethyl alcohol as the solvent. A period of one to twelve hours, depending upon the reactivity of the alkylating agent, may be employed. Generally, after four hours suffices. If quaternization of only part of the tertiary nitrogen atoms is desired, the amount of alkylating agent may be reduced to correspond with the number of tertiary nitrogen atoms desired to be converted.

When the monomers of Formulas V and VI are not substituted with methylol or alkoxymethyl groups, the copolymers may be methylolated by reaction with formaldehyde or alkoxymethylated by reaction with formaldehyde and a lower alcohol, such as methanol, ethanol, isopropanol, or butanol. These reactions may be effected before or after quaternization of the copolymer if it did not initially contain the required quaternary ammonium groups. The reaction with formaldehyde or its revertible polymers, such as paraformaldehyde is effected, with or without an alcohol, in an aqueous solution at a pH of 8 to 10.5 or so, the copolymers comprising units of Formula II generally requiring a pH of at least 10. Preferably, elevated temperatures are used from about 30° C. to 80° C. or higher for periods of fifteen minutes to an hour. Reaction with the alcohol preferably follows reaction with the formaldehyde by changing the pH to 3 to 4.5, adding alcohol if none was present during methylolation, and heating at 60° to 90° C. for fifteen minutes to an hour.

An alternate procedure for producing copolymers in which Y is —CONR— is to aminolyze polymers of an ester of acrylic or methacrylic acid, preferably poly(methyl acrylate) or a copolymer of at least 35 mole percent of methyl acrylate, by means of an amine of Formula IX:

IX 

and at least one amine having the structure of one of Formulas X and XI:

X     NH₃

XI 

the symbols in Formulas IX, X, and XI being the same as defined hereinbefore. The extent of aminolysis by the respective amine should be such as to provide at least the minimum proportion of the respective units of Formulas I, II, and III specified hereinabove after quaternization of the aminolysis product. The aminolysis may be effected by each amine in succession or simultaneously by a mixture of the several amines. After aminolysis, quaternization may be effected as described above. Generally, aminolysis is performed in a medium which is anhydrous or contains but little water unless considerable carboxyl groups are desired in the final polymeric product. The amine or amine mixture itself may serve as the solvent as well as the reactant for aminolyzing the polymerized methyl acrylate and aminolysis may be effected at temperatures of 90° to 130° C. in a time of 96 hours to 24 hours respectively, the time required generally being inversely proportional to the temperature. In the presence of a 3-to-4-fold excess of amine, complete aminolysis may be effected in the times and the temperatures just mentioned, and it has now been found that the higher the temperature employed, the higher is the final molecular weight of polymer obtained. A catalyst to accelerate the reaction is unnecessary, but an alkoxide, such as sodium methoxide, sodium ethoxide, or the like, may be used in amounts of from ½% to 20% by weight of the polymer. With a catalyst, an amount of the amine or amine mixture equivalent to the ester groups to be aminolyzed may be dissolved in a solvent such as toluene or additional amine, either the same or different, or an alcohol, such as methanol, ethanol, or butanol, and the complete aminolysis may be obtained in eight hours at a temperature of 80° to 90° C. An advantageous system is to start in toluene in which the polymerized ester is soluble and during the reaction to add an alcohol such as methanol, ethanol, or butanol in which the aminolyzed polymer is soluble, and subsequently to remove the solvent to obtain the final polymer.

The polymeric esters of alcohols other than methyl, such as of ethyl alcohol, propyl alcohol, butyl alcohol, and so on, require an increase in the time and temperature factor to produce a corresponding conversion of ester groups to amido groups in the polymer. Generally, when an amine used contains a primary nitrogen atom, it is necessary to maintain the reaction medium containing the polymeric ester and amine at a temperature below 130° C. in order to avoid imide formation with consequent cross-linking and insolubilization of the final polymer. However, when the aminolysis is effected by amines containing a secondary nitrogen atom but no primary nitrogen atom, there is no possibility of cross-linking or imide formation so that higher temperatures may be used up to 180° to 200° C.

Polymerized esters of the unsaturated acids in which the α-carbon atom is substituted by an alkyl group, such as methyl, ethyl, propyl or isopropyl, of which methyl methacrylate, methyl ethylacrylate and methyl propylacrylate are typical, are more difficult to aminolyze and when an amine containing a primary nitrogen atom is used, it is difficult to get aminolysis of 60% to 100% of the ester groups without cross-linking. Generally, however, the aminolysis may be effected at temperatures of 180° to 200° C. for three to seven hours with production of uncross-linked products which are up to 60% aminolyzed. Generally to get a larger proportion of the ester groups or all thereof in the polymer aminolyzed, a 5-to-10-fold excess of amine may be reacted at a temperature of 130° C. for a time of from four to seven days. Alternatively, an alkoxide catalyst may be used with 2-to- 4-fold excess amine or an amount of amine equivalent to the ester groups to be aminolyzed may be used at 130° C.

As the alkyl substituent on the α-carbon of the acrylic acid increases in size, more drastic conditions are generally required. Similarly, as the alkyl group of the ester increases in size, more drastic conditions are necessary to effect aminolysis; thus, when polymerized methyl methacrylate is replaced with polymerized ethyl methacrylate, longer times and higher temperatures must be used. As already stated, imide formation may be prevented by the use of amines which contain a secondary nitrogen atom but no primary nitrogen atom.

The difference in reactivity of these various esters makes it possible to obtain for all practical purposes a selective aminolysis of copolymers containing different ester units. For example, when the final quaternary ammonium compound desired to be produced is one containing methyl methacrylate as comonomer units, a copolymer of methyl methacrylate with at least 35 mole percent of methyl acrylate may serve as a starting material so that aminolysis converts the ester groups of the methyl acrylate units to amide units without affecting the ester units of the methyl methacrylate to any considerable extent. Such as aminolysis, for example, may be effected at 80° to 120° C. in the presence of an amount of an amine mixture which is equivalent to the ester groups in the methyl acrylate portion of the copolymer. Similarly, if it is desired to produce a copolymer containing quaternary ammonium groups with one or more comonomers of non-ester type listed hereinabove such as of styrene, a corresponding copolymer, as of styrene and methyl acrylate, may be used as the starting material in which the proportion of acrylate units corresponds to the number of acrylamide units desired and all such acrylate units may be converted to amide groups in the aminolysis.

Before or after quaternization, the copolymers may be methylolated or alkoxymethylated if the radical $R^4$ in their units of Formulas II and III are hydrogen.

The copolymers of the present invention are generally solid resinous materials which are generally water-soluble or easily self-dispersible in water. Those which have a considerable hydrophobic component either by virtue of the character of radicals A in the formulas or by virtue of hydrophobic comonomers may also be soluble in alcohols, chlorinated hydrocarbons or even in hydrocarbon solvents. They are generally of thermoplastic character but are convertible to insoluble and infusible character by heating, especially in the presence of an acid accelerator, or, when $R^4$ in the units of Formulas II and III is H, by reacting with formaldehyde, with or without an alcohol, such as methanol. Generally, their average molecular weight may range from 2,000 to 300,000 or more.

The polymers are useful for many purposes. Thus, they serve as insecticides, bactericides, fungicides; antistatic agents for treatment of hydrophobic plastic materials such as cellulose esters, cellulose acetate, vinyl resins, nylon, polyethylene terephthalate, etc. in the form of fibers, filaments, films, yarns, fabrics; for absorption of acid ions from liquids, such as oils or aqueous solutions; as flucculating and aggregating agents, such as in the purification of water or the concentration of ores, dispersants, softening agents for cellulosic textiles or films, especially rayon, cellulose acetate, and cotton fibers, fabrics, or films, including cellophane; as modifying components of film-forming materials, to improve the dyeing of fibers, filaments, films, textiles, and other shaped articles, formed therefrom, particularly of cellulose acetate and acrylonitrile polymers containing at least 75% acrylonitrile in the polymer molecule, especially when a common solvent, such as acetone, dimethylformamide or dimethylacetamide is used to prepare a spinning or extrusion dope containing the film-forming polymer and the dye-modifying polymer; as film-forming substances for coatings, adhesives, such as in warp-sizes, or loom finishes, in any of which applications it may be mixed with starches, casein, glue and the like; as anchoring agents for asbestos and cellulosic fibers, especially for addition to paper pulp or cellulosic pulps on which they are selectively absorbed and to which they are adapted to anchor acidic materials, such as copolymers of acrylic or methacrylic acid with other monomers as is described in McLaughlin United States Patent 2,765,229; as a pharmaceutical, especially for fungicidal and bactericidal purposes; also to isolate protein fractions by forming an insoluble complex and regenerating the protein.

The new copolymers are particularly valuable for applications to textiles. This may merely involve the application of the copolymers alone, by way of solutions or dispersions thereof, as in water. Or it may involve the application of a mixture of several substances including the new copolymers as one component thereof. In any application, of the copolymers to textiles, they may serve one or more purposes. As pointed out above, they may serve to soften cellulosic types of textiles; they may serve to reduce static on hydrophobic types; they may serve to render the textiles water-repellent; and so on.

In any of the applications as impregnants, coatings, or adhesives on paper, textiles, wood plies or other substrates, the compounds may be left in soluble condition for later removal, as by scouring, where that is desired. However, they have the advantage that they may be rendered insoluble and infusible as mentioned hereinabove to render the impregnations, coatings, or adhesive bonds of permanent character.

In the latter respect, the copolymers comprising units of Formula III are preferred as compared to those comprising units of Formula II because of the higher reactivity of the $R^4$ substituent when in the former units. Thus, when $R^4$ is H in copolymers of Formula III units, it is much more reactive toward formaldehyde, whether with or without alcohol, than the corresponding copolymers comprising Formula II units but no Formula III units. Likewise, when $R^4$ is methylol or alkoxymethyl in copolymers of Formula III units, it has greater reactivity than when in corresponding copolymers comprising Formula II units but no Formula III units. Hence, the former copolymers are more easily converted to insoluble condition. Surprisingly the difference in reactivity cannot be completely compensated for by longer time, higher temperature, and/or lower pH during the conversion when copolymers comprising units of Formula II but none of Formula III are used. Hence, the converted products of copolymers comprising units of Formula III are much more durable.

The conversion of the copolymers to insoluble condition may be, and preferably is, accelerated by the use of ½% to 2% of an acidic substance or curing catalyst based on the copolymer solution applied which may contain from about ½% to 15% by weight of the copolymer, and preferably contains 2% to 10% thereof when applied to textiles, especially for reducing the development of static charges thereon. The pickup on the fabric depends on the material of which it is made, a hydrophobic type generally taking up about 35% of the copolymer available in the solution and a hydrophilic type like cotton or rayon generally taking up 80% to 100% thereof.

Suitable acidic catalysts include ammonium phosphate, ammonium thiocyanate, hydrochloric or other acid salts of a hydroxy aliphatic amine including 2-methyl-2-amino-1-propanol, 2-methyl-2-amino-1,3-propandiol, tris(hydroxymethyl)aminomethane, 2 - phenyl - 2 - amino-1-propanol, 2-methyl-2-amino-1-pentanol, 2-aminobutanol, triethanolamine, 2-amino-2-ethyl-1-butanol, also ammonium chloride, pyridine hydrochloride, benzyldimethylamine oxalate; also hydrochloric, sulfuric, and phosphoric acids.

In the following examples, which are illustrative of the invention, the parts given are by weight unless otherwise noted:

Example 1

To a solution containing 345 parts of a 75% solution of poly(methyl acrylate) in toluene (prepared with 1.5% of benzoyl peroxide by weight on methyl acrylate inhibited with 0.15% of monomethyl ether of hydroquinone), 245 parts of γ-dimethylaminopropylamine, and 66 parts of methanol there are added at 50° C. 100.5 parts of 25% methanolic sodium methoxide. The reaction mixture is refluxed for about 16 hours. Then 90 parts of N-(2-aminoethyl)-N,N'-ethyleneurea and 60 parts of methanol are added and the resulting solution is refluxed for 17 hours. The resulting solution is diluted with 5 liters of absolute ethanol and stirred at 80° to 85° C. until the solution is homogeneous. Then 300 parts of dimethyl sulfate is added slowly and the solution is heated at 80° to 85° C. for 12 hours. The quaternary compound, isolated by evaporating the solvent, slurrying the solid residue with petroleum ether and drying, is a water-soluble light tan colored powder whose analysis indicated that it was a copolymer containing about 5.1 mole percent of methyl acrylate, 76.8 mole percent of 3-(acrylamido)propyltrimethylammoninum methyl sulfate units, and 18.1 mole percent of units having the Formula XII:

XII 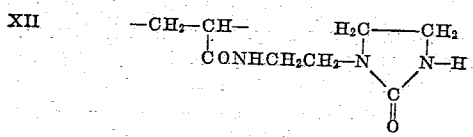

Example 2

The methylol derivative of the copolymer obtained in Example 1 is prepared by dissolving 15 parts of the copolymer in 75 parts of water, adjusting the pH to a value of 8.5 with sodium hydroxide, adding 5 parts of aqueous 37% formaldehyde, and heating at 75° C. for one hour. By this procedure, the units of Formula XII are converted to units of Formula XIII:

XIII 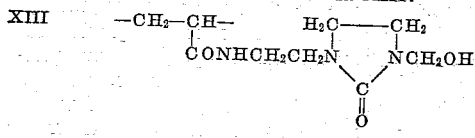

Example 3

The methylated methylol derivative of the copolymer of Example 1 is prepared by adding 50 parts of methanol to the solution obtained in Example 2, adjusting the pH to 3.5 with sulfuric acid and heating to 75° C. for 40 minutes. By this procedure the units of Formula XII are substantially all converted to units of Formula XIV:

XIV 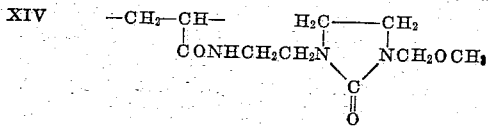

Example 4

The procedure of Example 1 is repeated except that instead of adding 300 parts of dimethyl sulfate to quaternize the copolymer 103 parts of allyl chloride are added slowly and the solution is heated at 80° to 85° C. for 12 hours. The copolymer isolated contained about 5.1 mole percent of methyl acrylate, 32.2 mole percent of N-(3-dimethylaminopropyl)acrylamide, 44.6 mole percent of 3-(acrylamidopropyl)allyldimethylammonium chloride, and 18.1 mole percent of units having Formula XII above.

Example 5

The methylol derivative (containing units of Formula XIII) of the copolymer of Example 4 is produced by the procedure of Example 2, substituting the copolymer of Example 4 for that of Example 1 in such procedure.

Example 6

The solution of the methylol derivative obtained in Example 5 is submitted to the procedure of Example 3 to produce the methoxymethyl derivative thereof (containing units of Formula XIV).

Example 7

The procedure of Example 1 is repeated except that instead of adding the 300 parts of dimethyl sulfate to quaternize the copolymer 176 parts of allyl chloride are added slowly and the solution is heated at 80° to 85° C. for 12 hours. The copolymer isolated contained about 5.1 mole percent of methyl acrylate, 76.8 mole percent of 3-(acrylamidopropyl)allyldimethylammonium chloride, and 18.1 mole percent of units having Formula XII above.

Example 8

The methylol derivative (containing units of Formula XIII) of the copolymer of Example 7 is produced by the procedure of Example 2, substituting the copolymer obtained in Example 7 for that obtained in Example 1 in such procedure.

Example 9

The solution of the methylol derivative obtained in Example 8 is submitted to the procedure of Example 3 to produce the methoxymethyl derivative thereof (containing units of Formula XIV).

Example 10

(a) To a solution containing 1.0 gram of β-ureidoethyl acrylate, 7.0 grams of β-(dimethylamino)ethyl acrylate, 8 grams of water, and 1.0 gram of piperidine is added 0.1 gram of ammonium persulfate and 0.05 gram of sodium hydrosulfite. Nitrogen is bubbled through the solution. The temperature increases to about 35° C. and remains there about 20 minutes. The addition of 0.1 gram of ammonium persulfate and 0.05 gram of sodium hydrosulfite does not cause a rise in temperature. After one hour at room temperature, the reaction mixture is poured into acetone to precipitate the polymer. The precipitate is dissolved in water, reprecipitated with acetone, and dried at 1 mm. Hg for ten hours.

(b) The white copolymer thus obtained is dissolved in 100 ml. of absolute ethanol and heated to 80° C. Then 6.7 grams of benzyl chloride is added slowly. The resulting solution is heated about 12 hours. The quaternary compound is isolated by evaporating the solvent, slurrying the solid residue with petroleum ether, and drying.

(c) The dried quaternized copolymer is dissolved in 30 parts of water which is adjusted to a pH of 8.8 with sodium hydroxide. Three parts of aqueous 37% formaldehyde and 20 parts of ethanol are added and the solution is heated at 75° C. for one hour to produce the methylol derivative. Then the pH is adjusted to 3.5 with hydrochloric acid and the solution is again heated to 75° C. for 45 minutes. The resulting copolymer contained β-acrylyloxyethylbenzyldimethylammonium chloride units, units of Formula XV:

XV 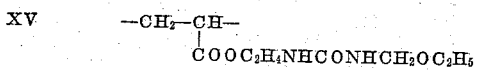

and some units like those of Formula XV in which one or more of the hydrogen atoms on the two nitrogen atoms are substituted by methylol and/or ethoxymethyl groups.

Example 11

The procedure of Example 10 (a) and (b) is repeated except that the ureidoethyl acrylate is replaced by the same amount of ureidoethyl methacrylate. The copolymer obtained has fungicidal properties, having an $LD_{50}$ toward *Stemphylium sarcinaeforme* and *Monilinia fructicola* of 30 parts per million. At 1% concentration it shows no phytotoxicity against tomatoes.

Example 12

The procedure of Example 10 (c) and (b) is repeated except that the monomers there used are replaced by 3 grams of N-(β-methacrylamidoethyl)-N,N'-ethyleneurea and 3 grams of diethylaminoethyl acrylate, and 2 grams of t-octyl acrylate. The resulting copolymer is methoxymethylated by the procedure of Example 10 (c) except that the ethanol is replaced with methanol. The resulting copolymer (7 grams) is dispersed in 90 grams of a dry-cleaning naphtha with the aid of 1 gram of a t-octylphenoxypolyethoxyethanol containing an average of about 10 oxyethylene units and 2 grams of a mixture of higher alcohols having 10 to 16 carbon atoms as a coupler for the several ingredients. The clear dispersion thus obtained is applied to a rayon fabric, dried, and then heated to 300° F. for 10 minutes to cure the copolymer on the fabric. The fabric has a water-repellent finish with a soft hand that is resistant to removal by dry cleaning and laundering. The application of the composition without the copolymer in it serves as a dry-cleaning agent which leaves a hand that is soft but is not as soft as that obtained with the copolymer and a slightly water-repellent finish, but neither the soft hand nor the water-repellency is permanent, that is, resistant to laundering and dry-cleaning.

Example 13

The procedure of Example 10 (a) is repeated except that the monomers are replaced with 65 grams of N-(β-hydroxyethyl)-methacrylamide and 72 grams of dimethylaminoethyl acrylate. Sixty percent of the amino groups in this copolymer are quaternized by the procedure of Example 10 (b) except that the benzyl chloride is replaced by 16 grams of methyl chloride and the reaction is carried out in a closed pressure vessel.

Two pieces of a wool fabric are padded through an aqueous solution containing 10% of the partially quaternized copolymer. After drying, one piece is heated to 300° F. for ten minutes and the other is passed through a 2% aqueous formaldehyde solution, dried and cured by heating to 300° F. for ten minutes. Whereas the untreated fabric shrinks about 45% when subjected to five hours washing at 140° F. in an aqueous solution containing 70 grams of Ivory soap in ten gallons of water, the first of the treated pieces shrinks only 7% and the other treated with formaldehyde as well as the copolymer shrinks only 4% after such a five-hour wash test.

The water-soluble or easily dispersed quaternized copolymers of the present invention are particularly useful as antistatics, as mentioned above. Generally, for application to this purpose, the copolymer is dissolved in concentrations of about 2% to 10% in water or polar organic solvents, such as the lower alcohols, such as methanol, ethanol, or isopropanol. These solutions may be applied to shaped articles of any hydrophobic material, especially of such polymeric materials as cellulose derivatives, especially cellulose esters like cellulose acetate and cellulose acetobutyrate, resinous condensation polymers or addition polymers including polyamides, like nylon of either the 66 type or caprolactam type, polyesters such as ethylene glycol terephthalate, and vinyl and acrylic polymers such as polyethylene, polytetrafluoroethylene, polytrifluorochloroethylene, polyvinyl chloride, polyvinylidene chloride, polyisobutylene, polystyrene, copolymers of vinyl chloride with vinyl acetate, vinylidene chloride, acrylonitrile, and acrylic esters, also polymers of acrylonitrile, methacrylonitrile, copolymerized with vinyl chloride, vinylidene chloride, vinyl acetate, vinyl pyridines, and so on, polymers of acrylic and methacrylic esters of alcohols having from 1 to 18 carbon atoms, such as methanol, ethanol, butanol, tert-octanol and dodecanol as well as copolymers of such acrylic and methacrylic acid esters with acrylonitrile, vinyl chloride, styrene, vinyl acetate, maleic acid esters and so on.

The hydrophobic material may have any form whatsoever such as the form of a film or sheet, solid rolls or tubes, but the invention is especially applicable to the handling of textile structures including fibers, filaments, yarns, cords and fabrics made therefrom, including woven, knitted, felted, braided and other interlocked fibers, filaments or yarns. In the following description and examples, reference will be made to a textile fabric as the material treated to reduce static charges. However, the general outline of procedural details applies as well to structures of the other types mentioned.

Thus, a textile fabric may be treated with the aqueous or organic solvent solution of the antistatic compound in a textile pad or by applying the solution by means of sprays, brushes, transfer rollers or the like. Excess solution may be removed by wiping, squeegeeing, squeezing or by shaking or vibrating.

After application of the solution and removal of excess, if such removal is desired, the treated fabric may be dried in the air such as for a period of 10 or 15 minutes when a polar organic solvent is used or for as much as ½ hour or an hour or more when aqueous solutions are used. If desired, forced drying at elevated temperatures up to about 212° F. may be employed, in all cases keeping the temperature of the fabric or other article below its temperature of decomposition and also below the point at which it would tend to soften or become tacky or shrink. This depends on the particular material being treated.

When the textile material is sensitive to elevated temperatures, the curing of the quaternary ammonium compound thereon may be effected merely by prolonged storage at normal room temperature or if desired at somewhat elevated temperatures within the drying range just mentioned. However, many hydrophobic materials of the type mentioned above are unharmed at temperatures even up to 450° F. provided the time of such treatment at elevated temperatures is not excessive. The curing of the quaternary ammonium compounds on such materials may be accelerated by heating the treated materials at temperatures of 220° F. to about 450° F. A time of 1 to 5 hours may be employed at the lower limit of the temperature range and a few seconds such as 2 to 10 seconds may be employed at the upper limit of the range. Generally, an intermediate temperature is preferable and a period of about 1 to 10 minutes is adequate for curing the materials at temperatures of 290° to 310° F.

Example 14

Fabrics of nylon, polyethylene terephthalate (Dacron) and a polymer of acrylonitrile having about 90% of acrylonitrile therein (Orlon) are padded through a 5% solution in water of the quaternary ammonium compound obtained in Example 3 hereof. After air drying the fabrics, they are cured at 300° F. for 10 minutes. The treated fabrics exhibit marked reduction in tendency to develop static charges and on retesting this quality after five launderings, there is no appreciable loss in the antistatic quality.

Example 15

The procedure of Example 14 is repeated using the copolymer of Example 6 instead of that of Example 3.

Example 16

The procedure of Example 14 is repeated using the copolymer of Example 9 instead of that of Example 3.

It is to be understood that changes and variations may be made without departing from the spirit and scope of the invention as defined in the appended claims.

I claim:
1. A composition comprising a linear addition copolymer of at least 30 to 80 mole percent of units of Formula I and between 5 and 20 mole percent of at least one unit selected from the group consisting of those of Formula III, the formulas being defined as follows:

I 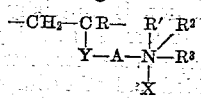

III 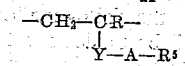

where R is selected from the group consisting of hydrogen and methyl, Y is selected from the group consisting of —CONR— and —COO—, A is an alkylene group having 2 to 10 carbon atoms, at least two of the carbon atoms thereof being connected in a chain between the N atom and the Y group of the formula, R' is selected from the group consisting of saturated and ethylenically unsaturated aliphatic hydrocarbon groups of 1 to 4 carbon atoms, $R^2$ is selected from the group consisting of saturated and ethylenically unsaturated aliphatic hydrocarbon groups of 1 to 4 carbon atoms, $R^3$ is selected from the group consisting of benzyl and saturated and ethylenically unsaturated aliphatic hydrocarbon groups of 1 to 4 carbon atoms, X is selected from the group consisting of negative, salt-forming atoms and radicals, $R^5$ is selected from the group consisting of —NHCONHR⁴ and

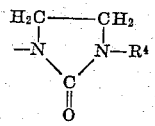

and $R^4$ is selected from the group consisting of hydrogen, methylol, and methoxymethyl.

2. A linear addition copolymer of at least 30 mole percent of units of the formula

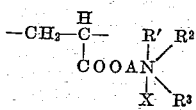

where A is an alkylene group having 2 to 10 carbon atoms, at least two of the carbon atoms thereof being connected in a chain between the N and O atoms, R' is an alkyl group having 1 to 4 carbon atoms, $R^2$ is an alkyl group having 1 to 4 carbon atoms, $R^3$ is a benzyl group, and X is an anion, and at least 5 mole percent of units of the formula

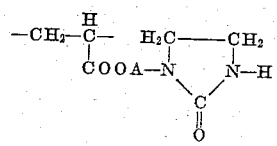

where A is as defined above.

3. A composition comprising a linear addition copolymer containing about 45 mole percent of (acrylamidopropyl)-allyldimethylammonium chloride and about 18 mole percent of units having the formula XVI 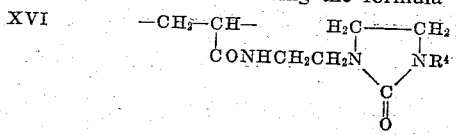

where $R^4$ is selected from the group consisting of hydrogen, methylol, and methoxymethyl.

4. A composition comprising a linear addition copolymer containing about 45 mole percent of (acrylamidopropyl)-allyldimethylammonium chloride, about 32 mole percent of dimethylaminopropylacrylamide units, about 5 mole percent of methyl acrylate units and about 18 mole percent of units having the Formula XVI defined in claim 3.

5. A composition comprising a linear addition copolymer containing about 77 mole percent of (acrylamidopropyl)-trimethylammonium methyl sulfate units and about 18 mole percent of units having the Formula XVI defined in claim 3.

6. A composition comprising a linear addition copolymer containing about 77 mole percent of (acrylamidopropyl)-trimethylammonium methyl sulfate units, about 5 mole percent of methyl acrylate units, and about 18 mole percent of units having the Formula XVI defined in claim 3.

7. A composition comprising a linear addition copolymer containing about 77 mole percent of (acrylamidopropyl)-allyldimethylammonium chloride units and about 18 mole percent of units having the Formula XVI defined in claim 3.

8. A composition comprising a linear addition copolymer containing about 77 mole percent of (acrylamidopropyl)-allyldimethylammonium chloride units, about 5 mole percent of methyl acrylate units, and about 18 mole percent of units having the Formula XVI defined in claim 3.

9. A composition comprising a linear addition copolymer containing about 45 mole percent of (acrylamidopropyl)-allyldimethylammonium chloride, about 32 mole percent of dimethylaminopropylacrylamide units, about 5 mole percent of methyl acrylate units, and about 18 mole percent of units having the Formula XVI of claim 3 in which $R^4$ is methoxymethyl.

10. A composition comprising a linear addition copolymer containing about 77 mole percent of (acrylamidopropyl)-trimethylammonium methyl sulfate units and about 18 mole percent of units having the Formula XVI of claim 3 in which $R^4$ is methoxymethyl.

11. A composition comprising a linear addition copolymer containing about 77 mole percent of (acrylamidopropyl)-trimethylammonium methyl sulfate units, about 5 mole percent of methyl acrylate units, and about 18 mole percent of units having the Formula XVI of claim 3 in which $R^4$ is methoxymethyl.

12. A composition comprising a linear addition copolymer containing about 77 mole percent of (acrylamidopropyl)-allyldimethylammonium chloride units and about 18 mole percent of units having the Formula XVI of claim 3 in which $R^4$ is methoxymethyl.

13. A composition comprising a linear addition copolymer containing about 77 mole percent of (acrylamidopropyl)-allyldimethylammonium chloride units, about 5 mole percent of methyl acrylate units, and about 18 mole percent of units having the Formula XVI of claim 3 in which $R^4$ is methoxymethyl.

14. A composition comprising a linear addition copolymer of at least 30 mole percent of quaternized β-dimethylaminoethyl acrylate units and at least 5 mole percent of β-ureidoethyl acrylate units.

15. A composition comprising a linear addition copolymer of at least 30 mole percent of quaternized β-dimethylaminoethyl acrylate units and at least 5 mole percent of β-ureidoethyl methacrylate units.

16. A composition comprising a linear addition copolymer of at least 30 mole percent of quaternized β-dimethylaminoethyl acrylate units and at least 5 mole percent of N-(β-methacrylamidoethyl)-N,N'-ethylene urea units.

17. A composition comprising a linear addition copolymer of at least 30 mole percent of quaternized β-dimethylaminoethyl acrylate units and at least 5 mole percent of N-(β-methacrylamidoethyl)-N,N'-ethylene urea units, and t-octyl acrylate units.

References Cited in the file of this patent

UNITED STATES PATENTS

| | | |
|---|---|---|
| 2,138,763 | Graves | Nov. 29, 1938 |
| 2,654,729 | Price | Oct. 6, 1953 |
| 2,677,699 | Barney | May 4, 1954 |
| 2,727,015 | Auten et al. | Dec. 13, 1955 |
| 2,741,568 | Hayek | Apr. 10, 1956 |